(12) United States Patent
Voisin

(10) Patent No.: US 6,564,533 B1
(45) Date of Patent: May 20, 2003

(54) METHOD OF RETAINING CLOSURE OF SHELLED BI-VALVE MOLLUSKS AND AN APPARATUS THEREFOR

(75) Inventor: Ernest A. Voisin, Houma, LA (US)

(73) Assignee: Innovatit Seafood Systems, LLC, Houma, LA (US)

( * ) Notice: Subject to any disclaimer, the term of this patent is extended or adjusted under 35 U.S.C. 154(b) by 0 days.

(21) Appl. No.: 09/602,906

(22) Filed: Jun. 23, 2000

Related U.S. Application Data

(60) Provisional application No. 60/140,737, filed on Jun. 25, 1999.

(51) Int. Cl.⁷ .......................... B65B 27/00; B65B 53/06
(52) U.S. Cl. ........................................... 53/557; 53/585
(58) Field of Search .................. 53/527, 557, 515, 53/585, 391; 198/699.1, 803.1

(56) References Cited

U.S. PATENT DOCUMENTS

| | | | |
|---|---|---|---|
| 2,648,125 A | | 8/1953 | McKenna et al. |
| 4,107,904 A | * | 8/1978 | Helgesen ...................... 53/247 |
| 4,318,685 A | * | 3/1982 | Konstantin ................... 53/557 |
| 4,386,490 A | * | 6/1983 | Griffith ........................ 43/252 |
| 4,401,020 A | * | 8/1983 | Brux ............................ 53/390 |
| 4,765,121 A | * | 8/1988 | Konstantin ................... 53/557 |
| 5,586,642 A | * | 12/1996 | Hawkins ................. 198/803.1 |
| 5,679,392 A | | 10/1997 | Schegan et al. |
| 5,741,536 A | | 4/1998 | Mauer et al. |
| 5,741,979 A | | 4/1998 | Arndt et al. |
| 5,744,184 A | | 4/1998 | Kendall et al. |
| 5,773,064 A | | 6/1998 | Tesvich et al. |
| 5,829,574 A | * | 11/1998 | DelSanto .................. 198/460.2 |

FOREIGN PATENT DOCUMENTS

| | | |
|---|---|---|
| BE | 1-001-206 | 8/1989 |
| FR | 2477842 A | 9/1981 |
| JP | 360049770 A | 3/1960 |
| JP | 4356156 | 12/1992 |
| JP | 2000 157157 | 6/2000 |

\* cited by examiner

*Primary Examiner*—John Sipos
(74) *Attorney, Agent, or Firm*—Keaty Professional Law Corporation

(57) ABSTRACT

A method and apparatus for retaining closure of shells of raw molluscan shellfish prior to high pressure processing involves positioning of heat-shrinkable band around each individual shellfish. The shellfish is then exposed to heated air of about 300–400 degrees Fahrenheit to 2–3 seconds, a time sufficient to cause shrinking of the band and secure adherence of the band to the shells. To prevent denaturing of raw shellfish the banded shellfish is then immediately exposed to a stream of cold air, about 30 degrees Fahrenheit for 1 second. Cooling of the banded shellfish arrests the heating process and helps retain sensory qualities of the product.

13 Claims, 1 Drawing Sheet

METHOD OF RETAINING CLOSURE OF SHELLED BI-VALVE MOLLUSKS AND AN APPARATUS THEREFOR

CROSS-REFERENCE TO RELATED APPLICATIONS

This application is a non-provisional application based on my provisional application Ser. No. 60/140,737 filed on Jun. 25, 1999 entitled "Apparatus to Apply Plastic Shrink Tape to Oysters and Other Molluskan Shellfish", the full disclosure of which is incorporated by reference herein.

BACKGROUND OF THE INVENTION

This invention relates to a method and apparatus for retaining closure of shells of bi-valve mollusks in preparation for high pressure processing. More particularly, the invention relates to a method of preventing escape of natural juices from the shells of molluskan shellfish, such as oysters, clams and the like.

It has been discovered that application of high pressure and heat to raw molluscan shellfish, more specifically to bi-valve mollusks, tends to release adductor muscle of the mollusks and allow easy opening of the shells for extracting the mollusk from the shell. This phenomenon is described in more detail in my co-pending applications relating to shucking of molluskan shellfish with the use of high pressure processing.

Opening of the shell during high-pressure processing may be desirable under certain circumstances. However, in some cases it is also important to prevent escape of natural juices from the shell during high-pressure processing. For instance, many restaurants arid oyster bars that serve raw shellfish on a half-shell prefer that the oysters arrive in their natural state, with the juices intact within their shell. Retention of juices, additionally, allows preserving the natural state of the shellfish and retaining sensory qualities of the product. It was discovered that banding of shelled shellfish prior to high pressure processing helps retain the shell halves closed and retain natural juices inside the shells.

One of the known shellfish banding processes is disclosed in U.S. Pat. No. 5,773,064 issued on Jun. 30, 1998 to Tesvich, et al. entitled "Heat Treatment of Raw Moleskin Shellfish Including a Banding Process." In that patent, a band is secured about the two halves of a molluskan shell, such as oyster. The band may be elastic, plastic, metal, heat-shrinkable material and is said to be applied about the mollusk by a conventional banding machine. The preferred band of the '064 patent is an elastic or rubber band. After banding, the mollusk is exposed to heat treatment in a fluid bath at a temperature of about 110 to 140 degrees Fahrenheit.

Another example of shellfish banding is disclosed in Japanese application No. 60049770A, published on Mar. 19, 1985. In the Japanese reference, it is suggested to bind a heat-resistant band about an unshelled shellfish and then seal the shellfish in a heat resistant plastic packaging.

While these patent documents suggest banding of shellfish, they do not disclose in any particular detail the method of applying the band or any apparatus for achieving this goal. The present invention contemplates provision of a method of retaining closure of shellfish during high pressure processing and an apparatus therefor.

SUMMARY OF THE INVENTION

It is, therefore, an object of the present invention to provide a method of retaining closure of shelled bivalve molluscan shellfish in preparation for high pressure processing.

It is another object of the present invention to provide an apparatus for use with the method of retaining closure of shelled bivalve mollusks in preparation to high-pressure treatment.

It is a further object of the present invention to provide an apparatus for use with the method of retaining closure of bi-valve mollusks by banding.

These and other objects of the present invention are achieved through a provision of a method and apparatus of banding raw shelled molluscan shellfish in preparation to high-pressure processing. Shelled product is placed on a conveyor belt that is divided into a plurality of compartments. Heat-shrink bands are wrapped around each shell. As the conveyor moves, the product is exposed to elevated temperature of about 300–400 degrees Fahrenheit for 2–3 seconds. Heat causes the band to shrink and tightly adhere around each shell.

To prevent denaturing of the product, moving the product on conveyor belt to the next station, which is a cool-down station, then immediately arrests heating process. The product is exposed to a stream of cold air of about 30 degrees Fahrenheit for about 1 second. Then, the conveyor moves the product downstream, where the product is deposited by gravity into a receiving container, which is placed below the end of the conveyor.

The conveyor belt is made of flexible, resilient slightly stretchable material. The conveyor is divided into a plurality of compartments by outwardly extending flexible separating members. When the belt moves around feed rollers, the outer surface of the conveyor belt stretches, and the shellfish is placed into the compartments. As the belt moves, it returns to its non-stretched condition, which causes the separating members, or fins to come closer together and secure the shelled product in the compartments.

As the conveyor belt moves around the downstream feed roller, the belt stretches again and the shells fall out of the compartments into the receiving container.

The method and apparatus of the present invention allow significantly expediting the banding process and reducing the labor costs. Additionally, uniform application of heat and cool air reduces the human-error factor, thereby preventing waste of the product.

BRIEF DESCRIPTION OF THE DRAWINGS

Reference will now be made to the drawings, wherein like parts are designated by like numerals, and wherein FIG. 1 Is a schematic view of the apparatus in accordance with the present invention for use with the method of banding bi-valve mollusks in preparation for high pressure processing.

DETAIL DESCRIPTION OF THE PREFERRED EMBODIMENT

Figure 1:
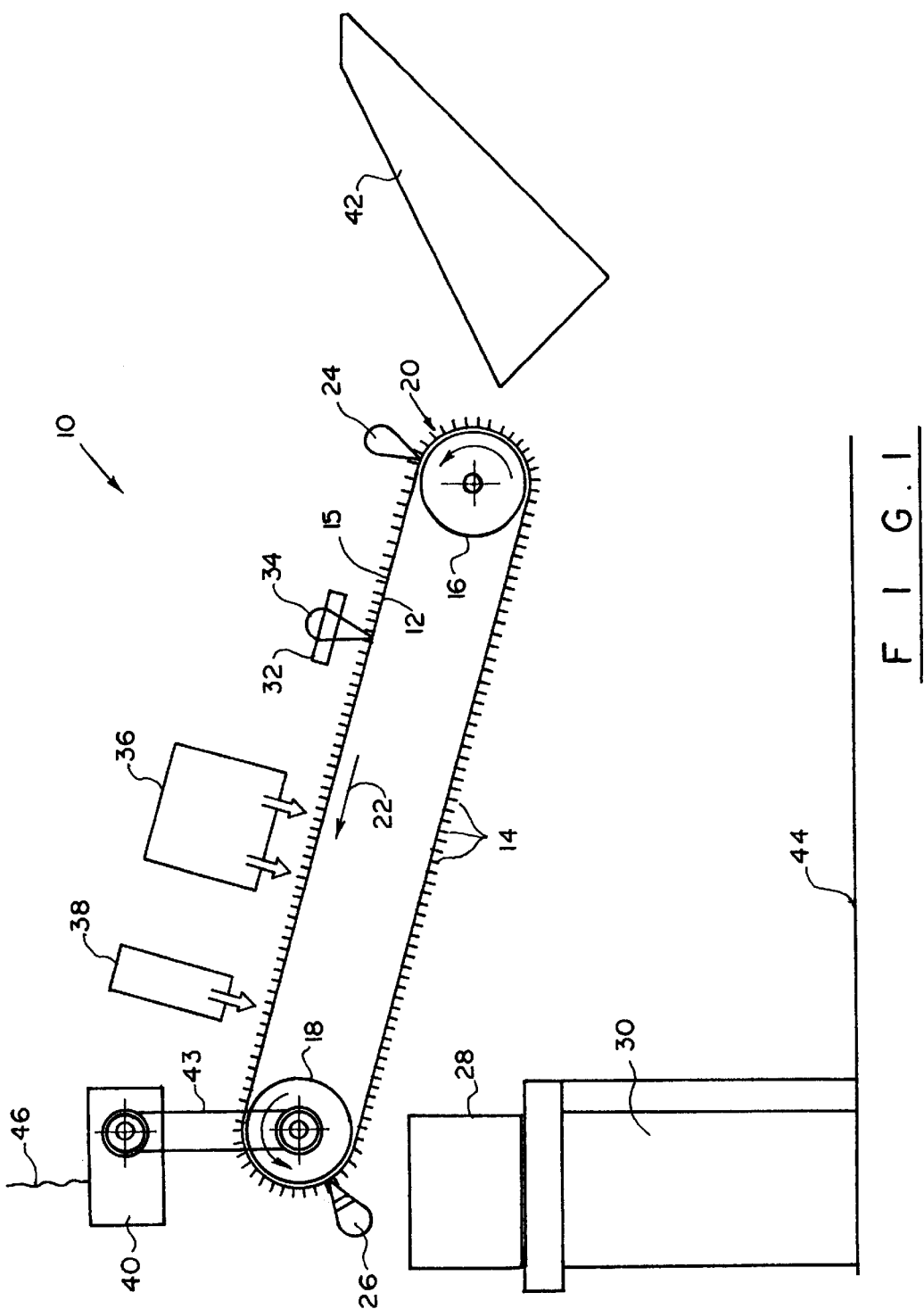

Referring to the drawing in more detail, numeral 10 designates the apparatus for use with the method of banding shelled shellfish in accordance with the present invention. As can be seen in the drawings, the apparatus 10 comprises several workstations, each facilitating the steps in the method of retaining closure of the bi-valve molluscan shell.

The apparatus 10 comprises a conveyor assembly 12 with a conveyor belt 15 provided with a plurality of outwardly extending separating fins 14. A conveyor belt 15 is made of flexible, resilient, somewhat stretchable material, such as for example rubber, the purpose of which will be described in more detail hereinafter.

The separating fins 14 are made from resilient, flexible material, for example rubber, to prevent mechanical damage to shellfish. The separating members, or fins 14 divide the supporting surface of the belt 15 into a plurality of equidistant compartments, or retaining areas 20.

The conveyor belt 15 moves in an endless loop between a first, upstream feed roller 16 and a second, downstream feed roller 18. The feed rollers 16 and 18, while in motion, tend to stretch the resilient outer surface of the conveyor belt 15 and enlarge the space between the adjacent separating members 14. When the belt 15 is stretched over the feed roller 16, the compartments 20 slightly "open" to allow a shellfish product, for example oyster, to be placed between adjacent fins 14.

Movement of the conveyor belt 15 in the direction of arrow 22 causes the conveyor belt 15 to return to its original un-stretched condition, causing the compartment 20 to return to their original size and allowing the separating members 14 to engage the individual shellfish product 24 while moving along the conveyor belt 15.

A similar phenomenon is present when the belt 15 moves around the feed roller 18 in the downstream end of the conveyor assembly 12. The resilient rubber belt 15 of the conveyor 12 is stretched again, allowing the oysters 26 to drop into a receiving container 28 that is held in place by a supporting table 30.

Mounted adjacent to the conveyor assembly 12 are a number of devices for banding the shellfish. After shellfish 24 is placed by hand into the compartment 20, a heat-shrink wrap 32 is manually placed around the shellfish 34 at the next workstation. The heat-shrink wrap is placed individually on each shellfish piece.

As the mollusks move along the conveyor 12 they come under a heater 36, which can be an electrical device that generates enough heat to cause the tape 32 to shrink and tightly adhere to the exterior surface of the shellfish 34. During the tests, it was discovered that temperature of about 300–400 degrees Fahrenheit is sufficient to cause shrinking of the tape. It was also determined that heat can be applied for two to three seconds. This temperature/time ratio is believed to be enough to cause shrinking of the tape 34, while preventing any denaturing of the product inside the shell.

Immediately after the tape 32 has been exposed to heat, the shell 34 is moved to the next stage of the process, which is cooling. A cooler 38 is placed immediately downstream of the heater 36 to apply cold air (about 30 degrees Fahrenheit) for one second to the banded shellfish product. The cooler 38 may be a refrigerator with a strong fan that blows cold air onto the conveyor. The cold air not only cools the band 32, but also arrests any heating process that may adversely affect raw shellfish.

Following the cooling stage, the shellfish product is brought downstream by the conveyor assembly 12 and transferred, by gravity, into a container 28 positioned below the downstream end of the conveyor assembly and supported by the table 30.

Standard electrical cables 46 to an electric motor and gearbox 40 drive the feed rollers 16 and 18 using sprockets 41 and chains 43, A conventional electric motor may be used for activation and energizing of conveyors. The electric motor 40 allows regulating the speed of movement of the conveyor belt 15 to allow manual placing of the shellfish product on the conveyor belt, as well as application of the heat-shrink tape 32 to the shell.

The apparatus 10 allows to considerably expediting manual process of banding shellfish. If, for example, every step of the process is done by hand, it takes about 10 seconds to process an individual shellfish product, such as for example oyster. With the apparatus of the present invention, not only the uniformity of the shrink tape application is achieved, but the speed of processing is reduced to about 2 seconds. Consequently, considerable labor cost saving may be achieved through the use of the method and apparatus of the present invention.

A further advantage of the apparatus and method of the present invention is that the quality of the product is improved since the heating and cooling stages of the process are performed on a continuous basis, for a pre-determined period of time, using pre-determined temperatures, thereby removing human error factor from the process. As a result, the quality of the product is significantly improved and the waste due to overheating or over cooling is reduced.

The speed of movement of the conveyor belt 15 can be minutely adjusted. During the test, it was discovered that travel of about 12 inches in 3 seconds was sufficient to properly band the shellfish. If desired, an optional hopper 42 may be placed adjacent to the upstream stage of the process, near the conveyor loading station to supply fresh raw product for banding. The conveyor 12 may be elevated from the horizontal surface, such as the floor 44 of a workroom to any desired height, preferably such that the steps of placing the shellfish onto the conveyor and the wrapping of tape 32 around the shell can be done at a convenient height for the workers.

Many changes and modifications can be made in the method and the apparatus of the present invention without departing from the spirit thereof. I, therefore, pray that my rights to the present invention be limited only by the scope of the appended claims.

I claim:

1. An apparatus for banding shelled molluscan shellfish, in preparation for high pressure processing, with shells having a circumferential edge, the apparatus comprising:
   a conveyor assembly comprising a conveyor belt divided into a plurality of compartments, each compartment having means for retaining at least one shell in an upright orientation on said circumferential edge;
   a motor means for moving said conveyor belt in an endless loop;
   a source of heat-shrinkable banding material;
   a source of heat positioned above said conveyor assembly; and
   a source of cooling air positioned above said conveyor downstream of said source of heat.

2. The apparatus of claim 1, wherein said conveyor assembly comprises a conveyor belt movable in an endless loop about a pair of feed rollers.

3. An apparatus for banding shelled molluscan shellfish in preparation for high pressure processing, with shells having a circumferential edge, the apparatus comprising:
   a conveyor assembly comprising a conveyor belt divided by outwardly extending flexible fins into a plurality of compartments, said conveyor belt moving in an endless loop about a pair of feed rollers, said conveyor belt being made from a flexible resilient stretchable material, said conveyor belt stretching while moving about said feed rollers, said conveyor belt returning to its original non-stretched condition after passing the feed rollers, said flexible fins retaining said shells in an upright orientation on said circumferential edge;
   a motor means for moving said conveyor belt in an endless loop;

a source of heat-shrinkable banding material;

a source of heat positioned above said conveyor assembly; and a source of cooling air positioned above said conveyor downstream of said source of heat.

4. The apparatus of claim 3, wherein said conveyor is divided into a plurality of compartments by outwardly extending flexible resilient separating members, said compartments enlarging while the belt moves around the feed rollers, said separating members closely engaging said shelled shellfish when the conveyor belt returns to the non-stretched condition.

5. The apparatus of claim 1, wherein said heat source has a sufficient power to provide a heated air output of about 300–400 degrees Fahrenheit.

6. The apparatus of claim 1, wherein said cooling air source has a sufficient power to provide a cool air output of about 30 degrees Fahrenheit.

7. The apparatus of claim 1, wherein a heat-shrinkable band from said source of heat-shrinkable banding material has a pre-determined length to be wrapped around individual shells of said shellfish prior to said conveyor moving said shelled shellfish below said source of beat.

8. An apparatus for securing bands on shells of molluscan shellfish, said shells having a circumferential edge, the apparatus comprising:

a conveyor assembly comprising a conveyor belt divided into a plurality of compartments, each compartment having a means for holding said shells upright on said circumferential edge, said compartments being adapted to receiving raw shellfish in shells therein with a heat-shrinkable band wrapped about individual shells;

a motor means for moving said conveyor belt in an endless loop;

a source of heat positioned above said conveyor assembly; and a source of cooling air positioned above said conveyor immediately downstream of said source of heat.

9. The apparatus of claim 8, wherein said motor means is adapted to move said conveyor belt at a speed sufficient to prevent excessive heat exposure of said raw shellfish and denaturing of said shellfish.

10. The apparatus of claim 8, wherein said heat source has a power sufficient to provide a heated air output of about 300–400 degrees Fahrenheit, and wherein said conveyor belt is adapted to move at a speed to expose said shellfish to heat for about 2–3 seconds.

11. The apparatus of claim 8, wherein said motor means is adapted to move said conveyor belt at a speed sufficient to arrest heating process of said raw shellfish and denaturing of said shellfish.

12. The apparatus of claim 8, wherein said cooling air source has sufficient power to provide a cool air output of about 30 degrees Fahrenheit, and wherein said conveyor belt is adapted to move at a speed to expose said shellfish to cooling air for about 1 second.

13. The apparatus of claim 1, wherein said means for retaining said shells in an upright orientation comprises a plurality of flexible fins extending outwardly from said conveyor belt.

* * * * *